May 15, 1951 — W. L. MORRISON, JR — 2,552,642
SAFETY PRESSURE RELEASE FOR PRESSURE COOKERS
Filed Aug. 15, 1947
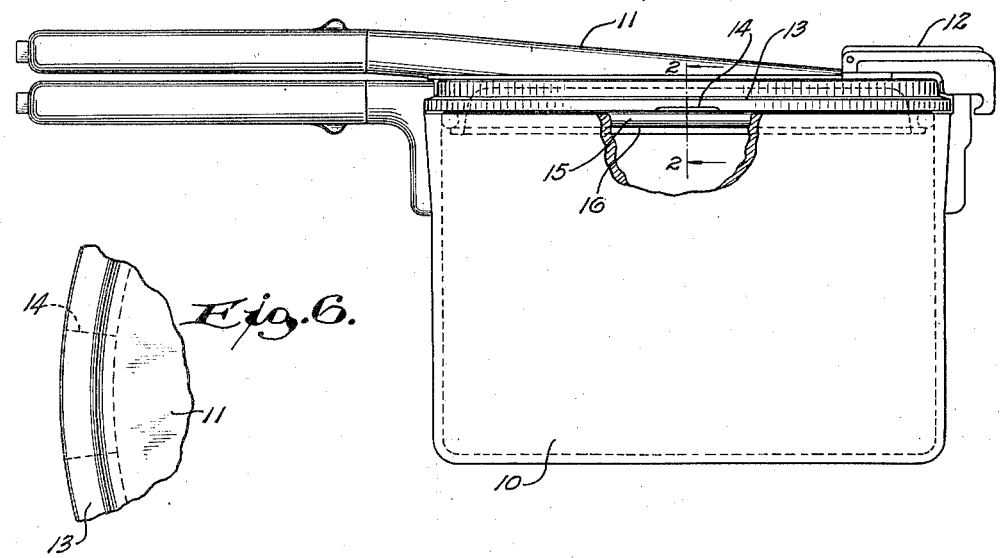
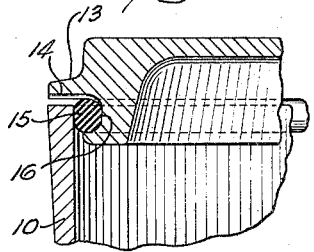
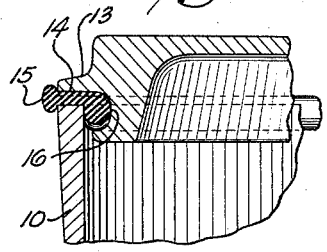
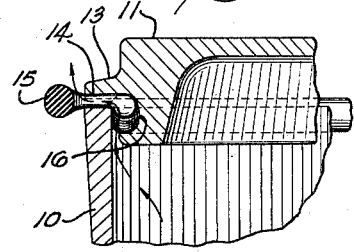
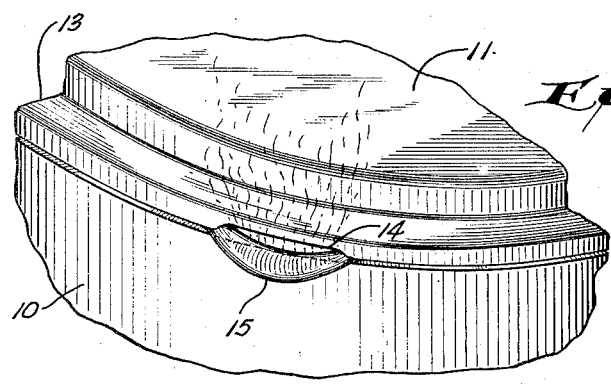
INVENTOR.
WILLARD L. MORRISON JR
BY John W. Michael
ATTORNEY.

Patented May 15, 1951

2,552,642

UNITED STATES PATENT OFFICE 2,552,642

SAFETY PRESSURE RELEASE FOR PRESSURE COOKERS

Willard L. Morrison, Jr., West Bend, Wis., assignor to West Bend Aluminum Co., West Bend, Wis., a corporation of Wisconsin Application August 15, 1947, Serial No. 768,832

1 Claim. (Cl. 220—44)

This invention relates to improvements in safety pressure releases for pressure cookers of the type adaptable for domestic household use.

Pressure cookers are provided with pressure regulators and conventional blow-out plugs designed to relieve pressure in the cooker when it exceeds an amount which the cooker can safely withstand. These conventional type plugs usually have relatively long circular passages which often plug up with food and fail to properly relieve the pressure. The operation of such conventional plugs is also erratic. Their inherent characteristics alter with age and vary with different production runs. Hence, their blow-out pressure point does not remain constant but increases. Once the plugs blow they must be replaced by means generally not within the skill of the housewife.

It is an object of this invention, therefore, to provide a safety pressure release for pressure cookers which will automatically start to relieve the pressure whenever it reaches a predetermined amount above that required for cooking and below that which the cooker can withstand without explosion, which will not clog and become obstructed by matter in the cooker, and which after functioning does not have to be replaced.

This object is obtained by providing a pressure cooker having a sealing ring supported between confronting surfaces on the cover and container and between which it is compressed by pressure in the cooker to create a pressure seal and by recessing one of the supporting surfaces for a determined area in order to diminish the support for the sealing ring along that area. With a rubber sealing ring of substantially circular cross section and approximately .250 inch in diameter and a recess of around .040 inch in depth and one inch in length, the support for the sealing ring will be sufficiently weakened so that pressure will be released past the sealing ring or the sealing ring blow-out when the pressure reaches approximately twenty-eight to thirty-one pounds per square inch. It is to be understood that with different size rings and with rings of composition other than rubber or of rubber of different compression factors the depth and length of the recess is altered in order to have pressure escape past the ring when the desired amount is reached.

The novel features, which are considered characteristic of the invention, are set forth with particularity in the appended claim. The invention itself, however, both as to its organization and its method of operation, together with additional objects and advantages thereof, will best be understood from the following description of a specific embodiment when read in connection with the accompanying drawings, in which:

Fig. 1 is a view in side elevation of a safety pressure release for a pressure cooker embodying the present invention, with parts being broken away and shown in section for the sake of clarity in illustration;

Figs. 2, 3, and 4 are enlarged fragmentary sectional views taken on the line 2—2 of Fig. 1, Fig. 2 showing the position of the sealing ring just prior to the escape of pressure past the ring, and Figs. 3 and 4 showing the manner in which a portion of the sealing ring is blown out of sealing position when pressures become excessive in the container;

Fig. 5 is an enlarged fragmentary perspective view showing the sealing ring after it has been blown from the container; and Fig. 6 is a top plan fragmentary view of the safety pressure recess formed in the top.

Referring to the drawing by reference numerals, the pressure cooker comprises a container 10 to which a cover 11 is secured by holding lugs or other conventional cover-retaining elements. The cover is provided with a pressure regulator 12 by which pressure is maintained at a desired cooking pressure. The cover has an annular depending flange, the outer surface of which is provided with a sealing ring receiving encircling groove 16. The cover also has a laterally extending rim 13 which overlies the top of the container when the cover is in position thereon. A sealing ring 15 formed of rubber or other compressible and resilient material of approximately .250 inch in diameter is carried in the groove 16. The ring 15 protrudes beyond the surface of the annular flange and engages the interior of the container 10 with a light pressure when the cover is in closed position. With this seal the cover 11 does not have to be pressed tightly against the top of the container to create the pressure seal. In fact, as pressure is established in the container, the cover rises slightly so that the rim 13 is slightly spaced from the top of the container. There is also clearance space between the interior of the container 10 and the exterior of the annular flange. Thus all the confronting sealing ring supporting surfaces are spaced. It is believed that the action of the pressure within the container tends to force the sealing ring between such confronting supporting surfaces to create a pressure seal.

It has been found, however, that if a recess 14, substantially .040 inch in depth and approximately one inch in length, is formed in the under surface of the rim 13, as the pressure reaches approximately twenty-eight pounds per square inch (which is thirteen pounds in excess of that required for domestic cooking purposes) steam will commence to pass the sealing ring 15 at the recess 14. In many instances if the heat applied to the cooker is increased uniformly at a reasonable rate, steam will escape at this recess and keep the pressure from building up to more than approximately thirty-one pounds per square inch. If heat is applied rapidly at an abnormal rate the escape is not sufficiently rapid and pressure tends to build up beyond this amount whereupon the sealing ring 15 will be compressed and blow out through the space between the recess 14 and the inner edge and top of the container 10 and a portion will extrude outside of the container as illustrated in Figs. 4 and 5. This will occur before the pressure within the container approaches a safety limit such as approximately forty to forty-five pounds per square inch. It should be understood that this safety limit is well below the pressure at which the container will fracture and explode.

There is some bending of the cover as pressure increases within the container. If this bending is lessened by reason of changes in the cover it may be necessary to increase the depth and width of the recess. Such alteration, however, is within the scope of this invention.

It will thus be seen that if pressure increases beyond the amount required for cooking, because of the application of greater heat than necesary or because of the failure of the regulating valve 12 to operate, steam will be released from the container to prevent pressure from increasing beyond a safe limit. Such release will always be accomplished without damage to the sealing ring. In fact, even though the sealing ring be extruded in the process of release of pressure, it will still not be made ineffective for subsequent use.

Although only one embodiment of the invention is shown and described herein, it will be understood that this application is intended to cover such changes or modifications as come within the spirit of the invention or scope of the following claim.

I claim:

A safety pressure release for a pressure cooker having a container and a cover with a rim overlying the top of said container and a depending annular flange fitting within said container which release will permit the gradual escape of some pressure as pressure increases within said cooker and which will permit the rapid escape of pressure when the pressure within said container reaches a predetermined amount in excess of that required for domestic cooking, said release comprising a first seal supporting surface consisting of the top encircling portion of the inside face of said container, a second seal supporting surface directly opposite said first surface and consisting of a groove encircling the outside of said flange, a resilient compressible ring of substantially round cross section partially contained in said groove and contacting both said first and second seal supporting surfaces to form a seal, the bottom of said rim acting to hold said ring between said surfaces, and a single recess in the bottom of said rim extending from said groove to the outer edge of said rim, said recess having a bottom facing said ring and engageable therewith as pressure rapidly increases within said cooker to guide a portion of said ring out of said cooker between said recess and the top of said container, said recess having a longitudinal extent of not in excess of that sufficient to permit a single loop of said ring to project from thereunder, said recess having a depth sufficient to permit steam gradually escaping between said ring and said second seal supporting surface to pass outside said cooker.

WILLARD L. MORRISON, JR.

REFERENCES CITED

The following references are of record in the file of this patent:

UNITED STATES PATENTS

| Number | Name | Date |
|---|---|---|
| 1,603,903 | Church | Oct. 19, 1926 |
| 2,147,325 | Wackman | Feb. 14, 1939 |
| 2,399,115 | Hansen et al. | Apr. 23, 1946 |
| 2,445,802 | Robinson | July 27, 1948 |